US012718728B2

(12) United States Patent
Dager et al.

(10) Patent No.: US 12,718,728 B2
(45) Date of Patent: Aug. 25, 2026

(54) HARDWARE EFFICIENT INTERPOLATION

(71) Applicant: QUALCOMM Incorporated, San Diego, CA (US)

(72) Inventors: Sandeep Dager, Ghaziabad (IN); Saurabh Kumar Shrimal, Noida (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/780,212

(22) Filed: Jul. 22, 2024

(65) Prior Publication Data

US 2026/0024477 A1 Jan. 22, 2026

(51) Int. Cl.
*G09G 3/20* (2006.01)

(52) U.S. Cl.
CPC ... *G09G 3/2003* (2013.01); *G09G 2320/0666* (2013.01)

(58) Field of Classification Search
CPC ......... G09G 3/2003; G09G 2320/0666; G09G 2340/04; G09G 2340/0407
See application file for complete search history.

(56) References Cited

U.S. PATENT DOCUMENTS

| | | | | |
|---|---|---|---|---|
| 11,069,095 | B1 | 7/2021 | Makarov | |
| 2018/0352114 | A1* | 12/2018 | Fukasawa | H04N 1/6008 |
| 2019/0174024 | A1* | 6/2019 | Fukasawa | H04N 1/603 |
| 2019/0189081 | A1* | 6/2019 | Fukasawa | H04N 1/603 |
| 2020/0045206 | A1* | 2/2020 | Yim | G09G 5/06 |
| 2025/0022397 | A1* | 1/2025 | Wu | H04N 1/60 |

FOREIGN PATENT DOCUMENTS

| | | | | |
|---|---|---|---|---|
| CN | 103957392 B | * | 6/2016 | |
| CN | 115082597 B | * | 12/2024 | G06T 11/40 |

OTHER PUBLICATIONS

Hormann K., et al., "A Quadrilateral Rendering Primitive", Proceedings of the 15th International Workshop on Programming Models and Applications for Multicores and Manycores, ACMPUB27, New York, NY, USA, Aug. 29, 2004, pp. 7-14, XP059749667, The whole document.
International Search Report and Written Opinion PCT/US2025/036284 ISA/EPO Nov. 11, 2025.
Quilez Inigo: "Inverse Bilinear Interpolation—2010", WayBack Machine, Jun. 1, 2022, XP093323770, 3 Pages, p. 1, figure 1. https://web.archive.org/web/20220601170333/https://iquilezles.org/articles/ibilinear/.

* cited by examiner

*Primary Examiner* — Kenneth Bukowski
(74) *Attorney, Agent, or Firm* — Procopio, Cory, Hargreaves & Savitch LLP

(57) ABSTRACT

This disclosure provides systems, devices, apparatus, and methods, including computer programs encoded on storage media, for interpolating a color for an interpolation point. A graphics processor may select a set of known points (known location, known color value) about an interpolation point. The processor may select a reference known point from the set of known points. The processor may determine a relative color value for each of the set of known points other than the selected reference known point based on a color difference between a corresponding known point and the selected reference known point. The processor may determine an interpolation color for the interpolation point based on the determined relative color value, the interpolation point, and a first known color value of the selected reference known point. The processor may output an indicator of the determined interpolation color for the interpolation point.

20 Claims, 10 Drawing Sheets

700

730

HARDWARE EFFICIENT INTERPOLATION

TECHNICAL FIELD

The present disclosure relates generally to processing systems, and more particularly, to one or more techniques for graphics processing.

INTRODUCTION

Computing devices often perform graphics and/or display processing (e.g., utilizing a graphics processing unit (GPU), a central processing unit (CPU), a display processor, etc.) to render and display visual content. Such computing devices may include, for example, computer workstations, mobile phones such as smartphones, embedded systems, personal computers, tablet computers, and video game consoles. GPUs are configured to execute a graphics processing pipeline that includes one or more processing stages, which operate together to execute graphics processing commands and output a frame. A central processing unit (CPU) may control the operation of the GPU by issuing one or more graphics processing commands to the GPU. Modern day CPUs are typically capable of executing multiple applications concurrently, each of which may need to utilize the GPU during execution. A display processor may be configured to convert digital information received from a CPU to analog values and may issue commands to a display panel for displaying the visual content. A device that provides content for visual presentation on a display may utilize a CPU, a GPU, and/or a display processor.

Current techniques may not address inefficient use of resources when determining an interpolation color for an interpolation point. There is a need for improved interpolation techniques.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may include a memory; and at least one processor coupled to the memory and, based at least in part on information stored in the memory, the at least one processor may be configured to select a set of known points about an interpolation point. Each of the set of known points may be associated with a known location and a known color value. The at least one processor may select the set of known points with known color values about an interpolation point. The at least one processor may be configured to select a reference known point from the set of known points. The at least one processor may be configured to determine a relative color value for each of the set of known points other than the selected reference known point based on a color difference between a corresponding known point and the selected reference known point. The at least one processor may be configured to determine an interpolation color for the interpolation point based on the determined relative color value for each of the set of known points other than the selected reference known point, the interpolation point, and a first known color value of the selected reference known point. The at least one processor may be configured to output an indicator of the determined interpolation color for the interpolation point.

In some aspects, the techniques described herein relate to a method of graphics processing, including: selecting a set of known points about an interpolation point, where each of the set of known points is associated with a known location and a known color value; selecting a reference known point from the set of known points; determining a relative color value for each of the set of known points other than the selected reference known point based on a color difference between a corresponding known point and the selected reference known point; determining an interpolation color for the interpolation point based on the determined relative color value for each of the set of known points other than the selected reference known point, the interpolation point, and a first known color value of the selected reference known point; and outputting an indicator of the determined interpolation color for the interpolation point.

In some aspects, the techniques described herein relate to a method, where selecting the set of known points includes: selecting at most four known points about the interpolation point.

In some aspects, the techniques described herein relate to a method, where determining the relative color value for each of the set of known points other than the selected reference known point based on the color difference between the corresponding known point and the selected reference known point includes: determining a first relative color value for a first known point of the set of known points as a first color difference between a second known color value of the first known point and the first known color value of the selected reference known point; determining a second relative color value for a second known point of the set of known points as a second color difference between a third known color value of the second known point and the first known color value of the selected reference known point; and determining a third relative color value for a third known point of the set of known points as a third color difference between a fourth known color value of the third known point and a sum of the second known color value of the first known point and the second relative color value.

In some aspects, the techniques described herein relate to a method, where determining the interpolation color for the interpolation point based on the determined relative color value for each of the set of known points other than the selected reference known point, the interpolation point, and the first known color value of the selected reference known point includes: bypassing a logical circuit associated with a product of a first dimension and a second dimension of the interpolation point in response to the third relative color value equaling zero.

In some aspects, the techniques described herein relate to a method, where determining the interpolation color for the interpolation point based on the determined relative color value for each of the set of known points other than the selected reference known point, the interpolation point, and the first known color value of the selected reference known point includes: multiplying the first relative color value with a first dimension of the interpolation point; multiplying the second relative color value with a second dimension of the interpolation point; and adding a first product of the first relative color value and the first dimension of the interpolation point and a second product of the second relative color value and the second dimension of the interpolation point to the first known color value of the selected reference known point.

In some aspects, the techniques described herein relate to a method, where the third relative color value compensates for a gradient plane twist of the set of known points.

In some aspects, the techniques described herein relate to a method, where determining the interpolation color for the interpolation point based on the determined relative color value for each of the set of known points other than the selected reference known point, the interpolation point, and the first known color value of the selected reference known point further includes: adding a third product of the first dimension of the interpolation point, the second dimension of the interpolation point, and the third relative color value to a second sum of the first product, the second product, and the first known color value.

In some aspects, the techniques described herein relate to a method, where determining the relative color value for each of the set of known points other than the selected reference known point based on the color difference between the corresponding known point and the selected reference known point further includes: determining the relative color value for each of the set of known points other than the selected reference known point using four adders.

In some aspects, the techniques described herein relate to a method, where the bypassed logical circuit includes two multipliers.

In some aspects, the techniques described herein relate to a method, where determining the interpolation color for the interpolation point based on the determined relative color value for each of the set of known points other than the selected reference known point, the interpolation point, and the first known color value of the selected reference known point further includes: determining the interpolation color for the interpolation point using two multipliers and an adder.

In some aspects, the techniques described herein relate to a method, where determining the interpolation color for the interpolation point based on the determined relative color value for each of the set of known points other than the selected reference known point, the interpolation point, and the first known color value of the selected reference known point further includes: determining the interpolation color for the interpolation point using four multipliers and three adders.

To the accomplishment of the foregoing and related ends, the one or more aspects include the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
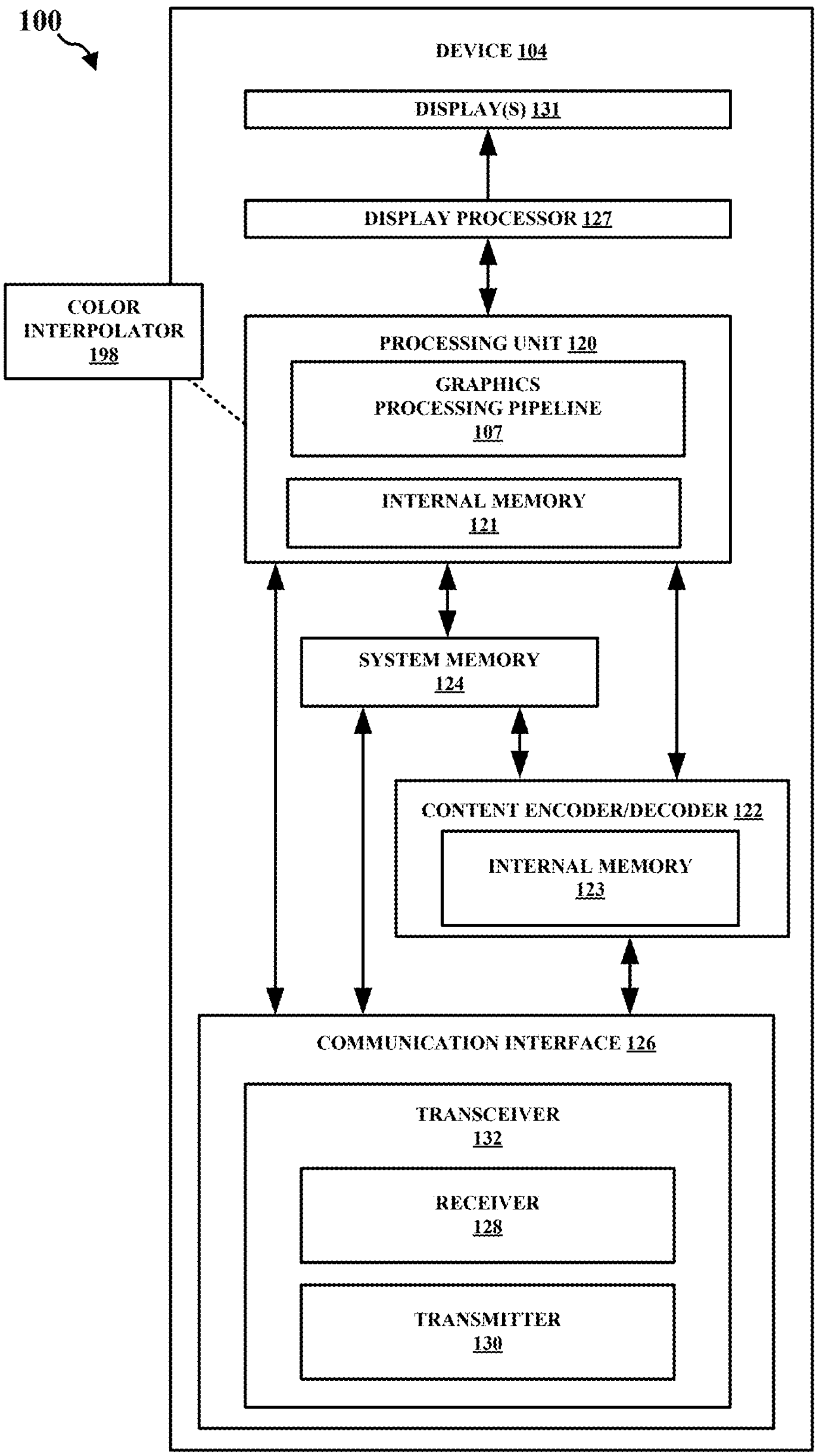
FIG. 1 is a block diagram that illustrates an example content generation system in accordance with one or more techniques of this disclosure.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, processing systems, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOCs), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

The term application may refer to software. As described herein, one or more techniques may refer to an application (e.g., software) being configured to perform one or more functions. In such examples, the application may be stored in a memory (e.g., on-chip memory of a processor, system memory, or any other memory). Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

In one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

As used herein, instances of the term "content" may refer to "graphical content," an "image," etc., regardless of whether the terms are used as an adjective, noun, or other parts of speech. In some examples, the term "graphical content," as used herein, may refer to a content produced by one or more processes of a graphics processing pipeline. In further examples, the term "graphical content," as used herein, may refer to a content produced by a processing unit configured to perform graphics processing. In still further examples, as used herein, the term "graphical content" may refer to a content produced by a graphics processing unit.

The following description is directed to examples for the purposes of describing innovative aspects of this disclosure. However, a person having ordinary skill in the art may recognize that the teachings herein may be applied in a multitude of ways. Some or all of the described examples may be implemented in any device or system that is capable of processing graphics commands. Various aspects relate generally to reprojecting and/or composing frames for a graphics processing unit (GPU). Some aspects more specifically relate to applying reprojection fallback strategies during an excess system load (e.g., when a reprojection process for a frame will not complete in time to display the frame). For example, a graphics system may have limited dynamic random access memory (DRAM) bandwidth due to concurrent work (e.g., rendering, GPU workload, high-intensity periods of camera data acquisition), software control latencies (e.g., poorly optimized code, latencies when communicating with third-party applications), bottlenecking hardware execution, and/or power/thermal throttling. Such loads may affect the calculated projected time for a reprojection process to complete within a threshold period of time. Use of remotely-rendered framebuffers (e.g., frames processed by a reprojection topology on a separate system, or a third-party system), may also affect the time to render a frame. For example, use of a second reprojection process may conserve resources if a first reprojection process uses remote-rendered framebuffers having a high calculated latency value, or if a first reprojection process uses a large amount of bandwidth (e.g., WiFi, 5G bandwidth) and a system is configured to conserve use of that bandwidth with respect to transmission/reception of remote-rendered frames.

In some examples, a graphics processor (or graphics processor system) may select a set of known points about an interpolation point. A known point may be a point with a known location (e.g., x, y coordinates) over a surface and a known color value (e.g., red green blue (RGB) color code represented by 256-bit values). An interpolation point may be a point with a known location and an unknown color value, which the graphics processor will derive. The processor may select a number of known points nearest to the interpolation point, for example the four nearest known points to the interpolation point. The graphics processor may select a reference known point from the set of known points. The graphics processor may designate any of the selected known points as a reference known point. The graphics processor may use the color value of the reference known point as a reference color value. The graphics processor may refer to the color values of the other known points in terms of a color value differential from the reference color value of the reference known point. The graphics processor may determine a relative color value for each of the set of known points other than the selected reference known point based on a color difference between the known color value of a corresponding known point and the known color value of the selected reference known point. The graphics processor may determine an interpolation color for the interpolation point based on the determined relative color value for each of the set of known points other than the selected reference known point, the interpolation point, and a first known color value of the selected reference known point. The graphics processor may be configured to output an indicator of the determined interpolation color for the interpolation point.

The architecture for an improved bilinear interpolation may use relative color with respect to a reference known point (referred to as T0) in a fixed point or a block floating point unit. The color value of other known points (e.g., T1, T2, and T3) may be referred to by their relative color with respect to the reference known point (e.g., T1−T0, T2−T0, T3−T0). The architecture may perform relative computations in common exponent form before converting the form to a floating point color format.

The new architecture may use less circuits compared to other architectures, for example, 4 multiplier circuits instead of 8 multiplier circuits.

Particular aspects of the subject matter described in this disclosure can be implemented to realize one or more of the following potential advantages. In some examples, by using relative color values to calculate an interpolation color value, the described techniques can be used to efficiently utilize hardware and use less resources to calculate an interpolation color of an interpolation point.

The examples describe herein may refer to a use and functionality of a graphics processing unit (GPU). As used herein, a GPU can be any type of graphics processor, and a graphics processor can be any type of processor that is designed or configured to process graphics content. For example, a graphics processor or GPU can be a specialized electronic circuit that is designed for processing graphics content. As an additional example, a graphics processor or GPU can be a general purpose processor that is configured to process graphics content.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of a SOC. The device 104 may include one or more components configured to perform one or more techniques of this disclosure. In the example shown, the device 104 may include a processing unit 120, a content encoder/decoder 122, and a system memory 124. In some aspects, the device 104 may include a number of components (e.g., a communication interface 126, a transceiver 132, a receiver 128, a transmitter 130, a display processor 127, and one or more displays 131). Display(s) 131 may refer to one or more displays 131. For example, the display 131 may include a single display or multiple displays, which may include a first display and a second display. The first display may be a left-eye display and the second display may be a right-eye display. In some examples, the first display and the second display may receive different frames for presentment thereon. In other examples, the first and second display may receive the same frames for presentment thereon. In further examples, the results of the graphics processing may not be displayed on the device, e.g., the first display and the second display may not receive any frames for presentment thereon. Instead, the frames or graphics processing results may be transferred to another device. In some aspects, this may be referred to as split-rendering.

The processing unit 120 may include an internal memory 121. The processing unit 120 may be configured to perform graphics processing using a graphics processing pipeline 107. The content encoder/decoder 122 may include an internal memory 123.

In some examples, the device 104 may include a processor, which may be configured to perform one or more display processing techniques on one or more frames generated by the processing unit 120 before the frames are displayed by the one or more displays 131. While the processor in the example content generation system 100 is configured as a display processor 127, it should be understood that the display processor 127 is one example of the processor and that other types of processors, controllers, etc., may be used as substitute for the display processor 127. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 may be communicatively coupled to the system memory 124 over a bus. In some examples, the processing unit 120 and the content encoder/decoder 122 may be communicatively coupled to the internal memory 121 over the bus or via a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, static random access memory (SRAM), dynamic random access memory (DRAM), erasable programmable ROM (EPROM), EEPROM, flash memory, a magnetic data media or an optical storage media, or any other type of memory. The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a CPU, a GPU, GPGPU, or any other processing unit that may be configured to perform graphics processing. In some examples, the processing unit 120 may be integrated into a motherboard of the device 104. In further examples, the processing unit 120 may be present on a graphics card that is installed in a port of the motherboard of the device 104, or may be otherwise incorporated within a peripheral device configured to interoperate with the device 104. The processing unit 120 may include one or more processors, such as one or more microprocessors, GPUs, ASICs, FPGAs, arithmetic logic units (ALUs), DSPs, discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 may include a communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, and/or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the processing unit 120 may include a color interpolator 198 configured to select a set of known points about an interpolation point. Each of the set of known points may be associated with a known location and a known color value. The color interpolator 198 may be configured to select a reference known point from the set of known points. The color interpolator 198 may be configured to determine a relative color value for each of the set of known points other than the selected reference known point based on a color difference between a corresponding known point and the selected reference known point. The color interpolator 198 may be configured to determine an interpolation color for the interpolation point based on the determined relative color value for each of the set of known points other than the selected reference known point, the interpolation point, and a first known color value of the selected reference known point. The color interpolator 198 may be configured to output an indicator of the determined interpolation color for the interpolation point. Although the following description may be focused on graphics processing, the concepts described herein may be applicable to other similar processing techniques.

A device, such as the device 104, may refer to any device, apparatus, or system configured to perform one or more techniques described herein. For example, a device may be a server, a base station, a user equipment, a client device, a station, an access point, a computer such as a personal computer, a desktop computer, a laptop computer, a tablet computer, a computer workstation, or a mainframe computer, an end product, an apparatus, a phone, a smart phone, a server, a video game platform or console, a handheld device such as a portable video game device or a personal digital assistant (PDA), a wearable computing device such as a smart watch, an augmented reality device, or a virtual reality device, a non-wearable device, a display or display device, a television, a television set-top box, an intermediate network device, a digital media player, a video streaming device, a content streaming device, an in-vehicle computer, any mobile device, any device configured to generate graphical content, or any device configured to perform one or more techniques described herein. Processes herein may be described as performed by a particular component (e.g., a GPU) but in other embodiments, may be performed using other components (e.g., a CPU) consistent with the disclosed embodiments.

GPUs can process multiple types of data or data packets in a GPU pipeline. For instance, in some aspects, a GPU can process two types of data or data packets, e.g., context register packets and draw call data. A context register packet can be a set of global state information, e.g., information regarding a global register, shading program, or constant data, which can regulate how a graphics context will be processed. For example, context register packets can include information regarding a color format. In some aspects of context register packets, there can be a bit or bits that indicate which workload belongs to a context register. Also, there can be multiple functions or programming running at the same time and/or in parallel. For example, functions or programming can describe a certain operation, e.g., the color mode or color format. Accordingly, a context register can define multiple states of a GPU.

Context states can be utilized to determine how an individual processing unit functions, e.g., a vertex fetcher (VFD), a vertex shader (VS), a shader processor, or a geometry processor, and/or in what mode the processing unit functions. In order to do so, GPUs can use context registers and programming data. In some aspects, a GPU can generate a workload, e.g., a vertex or pixel workload, in the pipeline based on the context register definition of a mode or state. Certain processing units, e.g., a VFD, can use these states to determine certain functions, e.g., how a vertex is assembled. As these modes or states can change, GPUs may need to change the corresponding context. Additionally, the workload that corresponds to the mode or state may follow the changing mode or state.

Figure 2:
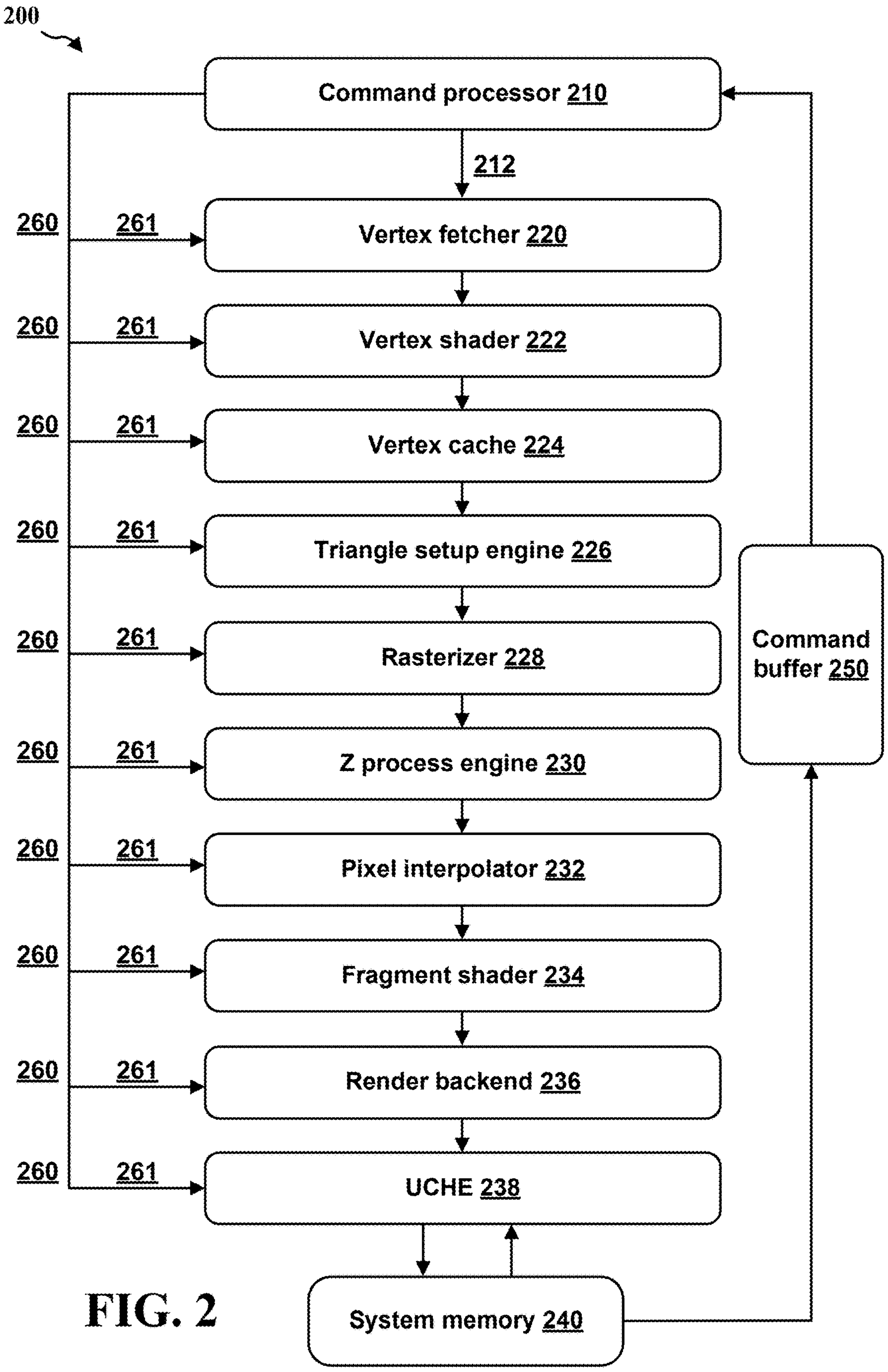
FIG. 2 illustrates an example GPU in accordance with one or more techniques of this disclosure.

FIG. 2 illustrates an example GPU 200 in accordance with one or more techniques of this disclosure. As shown in FIG. 2, GPU 200 includes command processor (CP) 210, draw call packets 212, VFD 220, VS 222, vertex cache (VPC) 224, triangle setup engine (TSE) 226, rasterizer (RAS) 228, Z process engine (ZPE) 230, pixel interpolator (PI) 232, fragment shader (FS) 234, render backend (RB) 236, L2 cache (UCHE) 238, and system memory 240. Although FIG. 2 displays that GPU 200 includes processing units 220-238, GPU 200 can include a number of additional processing units. Additionally, processing units 220-238 are merely an example and any combination or order of processing units can be used by GPUs according to the present disclosure. GPU 200 also includes command buffer 250, context register packets 260, and context states 261.

As shown in FIG. 2, a GPU can utilize a CP, e.g., CP 210, or hardware accelerator to parse a command buffer into context register packets, e.g., context register packets 260, and/or draw call data packets, e.g., draw call packets 212. The CP 210 can then send the context register packets 260 or draw call data packets 212 through separate paths to the processing units or blocks in the GPU. Further, the command buffer 250 can alternate different states of context registers and draw calls. For example, a command buffer can simultaneously store the following information: context register of context N, draw call(s) of context N, context register of context N+1, and draw call(s) of context N+1.

GPUs can render images in a variety of different ways. In some instances, GPUs can render an image using direct rendering and/or tiled rendering. In tiled rendering GPUs, an image can be divided or separated into different sections or tiles. After the division of the image, each section or tile can be rendered separately. Tiled rendering GPUs can divide computer graphics images into a grid format, such that each portion of the grid, i.e., a tile, is separately rendered. In some aspects of tiled rendering, during a binning pass, an image can be divided into different bins or tiles. In some aspects, during the binning pass, a visibility stream can be constructed where visible primitives or draw calls can be identified. A rendering pass may be performed after the binning pass. In contrast to tiled rendering, direct rendering does not divide the frame into smaller bins or tiles. Rather, in direct rendering, the entire frame is rendered at a single time (i.e., without a binning pass). Additionally, some types of GPUs can allow for both tiled rendering and direct rendering (e.g., flex rendering).

In some aspects, GPUs can apply the drawing or rendering process to different bins or tiles. For instance, a GPU can render to one bin, and perform all the draws for the primitives or pixels in the bin. During the process of rendering to a bin, the render targets can be located in GPU internal memory (GMEM). In some instances, after rendering to one bin, the content of the render targets can be moved to a system memory and the GMEM can be freed for rendering the next bin. Additionally, a GPU can render to another bin, and perform the draws for the primitives or pixels in that bin. Therefore, in some aspects, there might be a small number of bins, e.g., four bins, that cover all of the draws in one surface. Further, GPUs can cycle through all of the draws in one bin, but perform the draws for the draw calls that are visible, i.e., draw calls that include visible geometry. In some aspects, a visibility stream can be generated, e.g., in a binning pass, to determine the visibility information of each primitive in an image or scene. For instance, this visibility stream can identify whether a certain primitive is visible or not. In some aspects, this information can be used to remove primitives that are not visible so that the non-visible primitives are not rendered, e.g., in the rendering pass. Also, at least some of the primitives that are identified as visible can be rendered in the rendering pass.

In some aspects of tiled rendering, there can be multiple processing phases or passes. For instance, the rendering can be performed in two passes, e.g., a binning, a visibility or bin-visibility pass and a rendering or bin-rendering pass. During a visibility pass, a GPU can input a rendering workload, record the positions of the primitives or triangles, and then determine which primitives or triangles fall into which bin or area. In some aspects of a visibility pass, GPUs can also identify or mark the visibility of each primitive or triangle in a visibility stream. During a rendering pass, a GPU can input the visibility stream and process one bin or area at a time. In some aspects, the visibility stream can be analyzed to determine which primitives, or vertices of primitives, are visible or not visible. As such, the primitives, or vertices of primitives, that are visible may be processed. By doing so, GPUs can reduce the unnecessary workload of processing or rendering primitives or triangles that are not visible.

In some aspects, during a visibility pass, certain types of primitive geometry, e.g., position-only geometry, may be processed. Additionally, depending on the position or location of the primitives or triangles, the primitives may be sorted into different bins or areas. In some instances, sorting primitives or triangles into different bins may be performed by determining visibility information for these primitives or triangles. For example, GPUs may determine or write visibility information of each primitive in each bin or area, e.g., in a system memory. This visibility information can be used to determine or generate a visibility stream. In a rendering pass, the primitives in each bin can be rendered separately. In these instances, the visibility stream can be fetched from memory and used to remove primitives which are not visible for that bin.

Some aspects of GPUs or GPU architectures can provide a number of different options for rendering, e.g., software rendering and hardware rendering. In software rendering, a driver or CPU can replicate an entire frame geometry by processing each view one time. Additionally, some different states may be changed depending on the view. As such, in software rendering, the software can replicate the entire workload by changing some states that may be utilized to render for each viewpoint in an image. In certain aspects, as GPUs may be submitting the same workload multiple times for each viewpoint in an image, there may be an increased amount of overhead. In hardware rendering, the hardware or GPU may be responsible for replicating or processing the geometry for each viewpoint in an image. Accordingly, the hardware can manage the replication or processing of the primitives or triangles for each viewpoint in an image.

Figure 3:
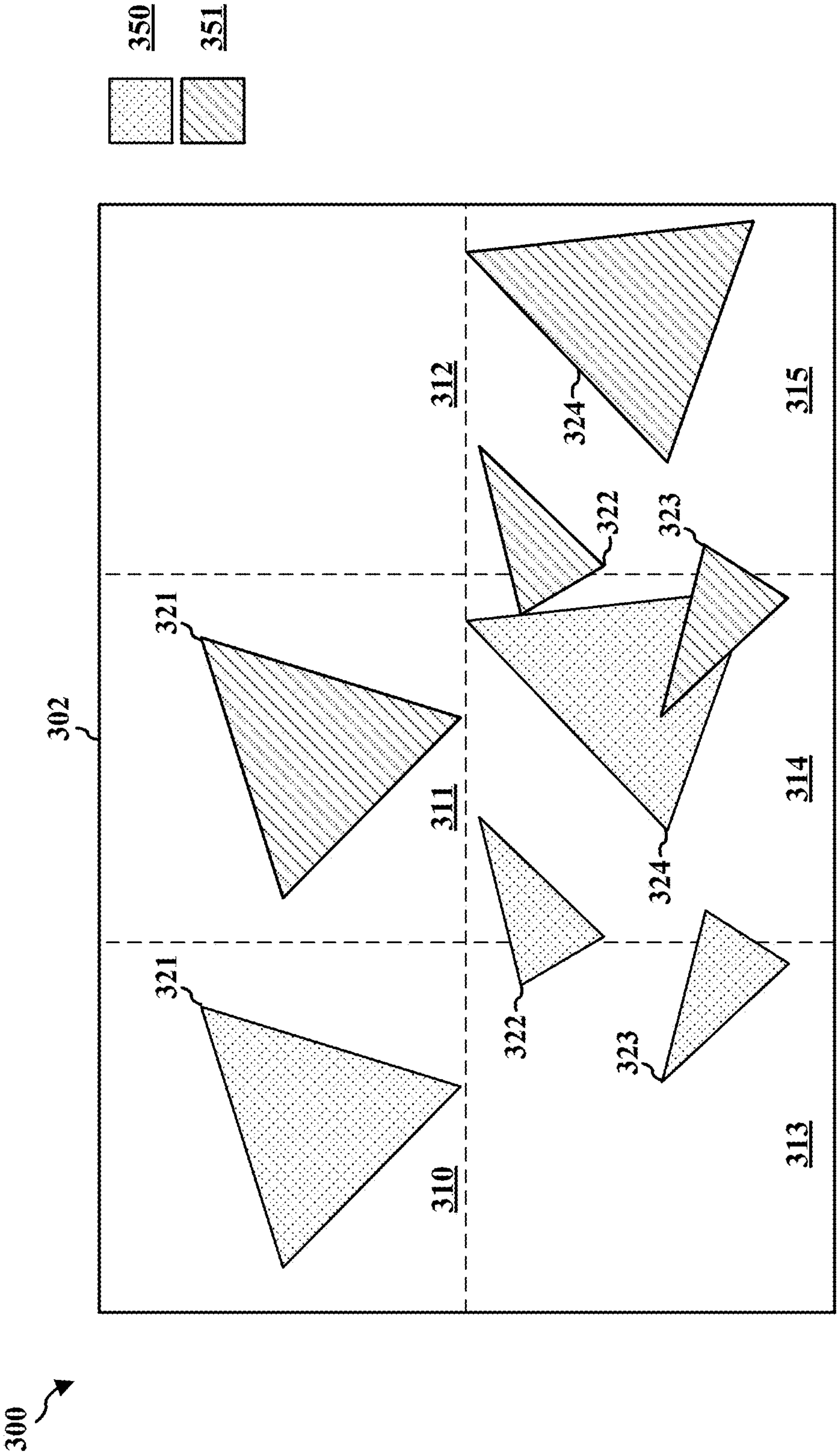
FIG. 3 illustrates an example image or surface in accordance with one or more techniques of this disclosure.

FIG. 3 illustrates image or surface 300, including multiple primitives divided into multiple bins in accordance with one or more techniques of this disclosure. As shown in FIG. 3, image or surface 300 includes area 302, which includes primitives 321, 322, 323, and 324. The primitives 321, 322, 323, and 324 are divided or placed into different bins, e.g., bins 310, 311, 312, 313, 314, and 315. FIG. 3 illustrates an example of tiled rendering using multiple viewpoints for the primitives 321-324. For instance, primitives 321-324 are in first viewpoint 350 and second viewpoint 351. As such, the GPU processing or rendering the image or surface 300 including area 302 can utilize multiple viewpoints or multi-view rendering.

As indicated herein, GPUs or graphics processors can use a tiled rendering architecture to reduce power consumption or save memory bandwidth. As further stated above, this rendering method can divide the scene into multiple bins, as well as include a visibility pass that identifies the triangles that are visible in each bin. Thus, in tiled rendering, a full screen can be divided into multiple bins or tiles. The scene can then be rendered multiple times, e.g., one or more times for each bin.

In aspects of graphics rendering, some graphics applications may render to a single target, i.e., a render target, one or more times. For instance, in graphics rendering, a frame buffer on a system memory may be updated multiple times. The frame buffer can be a portion of memory or random access memory (RAM), e.g., containing a bitmap or storage, to help store display data for a GPU. The frame buffer can also be a memory buffer containing a complete frame of data. Additionally, the frame buffer can be a logic buffer. In some aspects, updating the frame buffer can be performed in bin or tile rendering, where, as discussed above, a surface is divided into multiple bins or tiles and then each bin or tile can be separately rendered. Further, in tiled rendering, the frame buffer can be partitioned into multiple bins or tiles.

As indicated herein, in some aspects, such as in bin or tiled rendering architecture, frame buffers can have data stored or written to them repeatedly, e.g., when rendering from different types of memory. This can be referred to as resolving and unresolving the frame buffer or system memory. For example, when storing or writing to one frame buffer and then switching to another frame buffer, the data or information on the frame buffer can be resolved from the GMEM at the GPU to the system memory, i.e., memory in the double data rate (DDR) RAM or dynamic RAM (DRAM).

In some aspects, the system memory can also be system-on-chip (SoC) memory or another chip-based memory to store data or information, e.g., on a device or smart phone. The system memory can also be physical data storage that is shared by the CPU and/or the GPU. In some aspects, the system memory can be a DRAM chip, e.g., on a device or smart phone. Accordingly, SoC memory can be a chip-based manner in which to store data.

In some aspects, the GMEM can be on-chip memory at the GPU, which can be implemented by static RAM (SRAM). Additionally, GMEM can be stored on a device, e.g., a smart phone. As indicated herein, data or information can be transferred between the system memory or DRAM and the GMEM, e.g., at a device. In some aspects, the system memory or DRAM can be at the CPU or GPU. Additionally, data can be stored at the DDR or DRAM. In some aspects, such as in bin or tiled rendering, a small portion of the memory can be stored at the GPU, e.g., at the GMEM. In some instances, storing data at the GMEM may utilize a larger processing workload and/or consume more power compared to storing data at the frame buffer or system memory.

Figure 4:
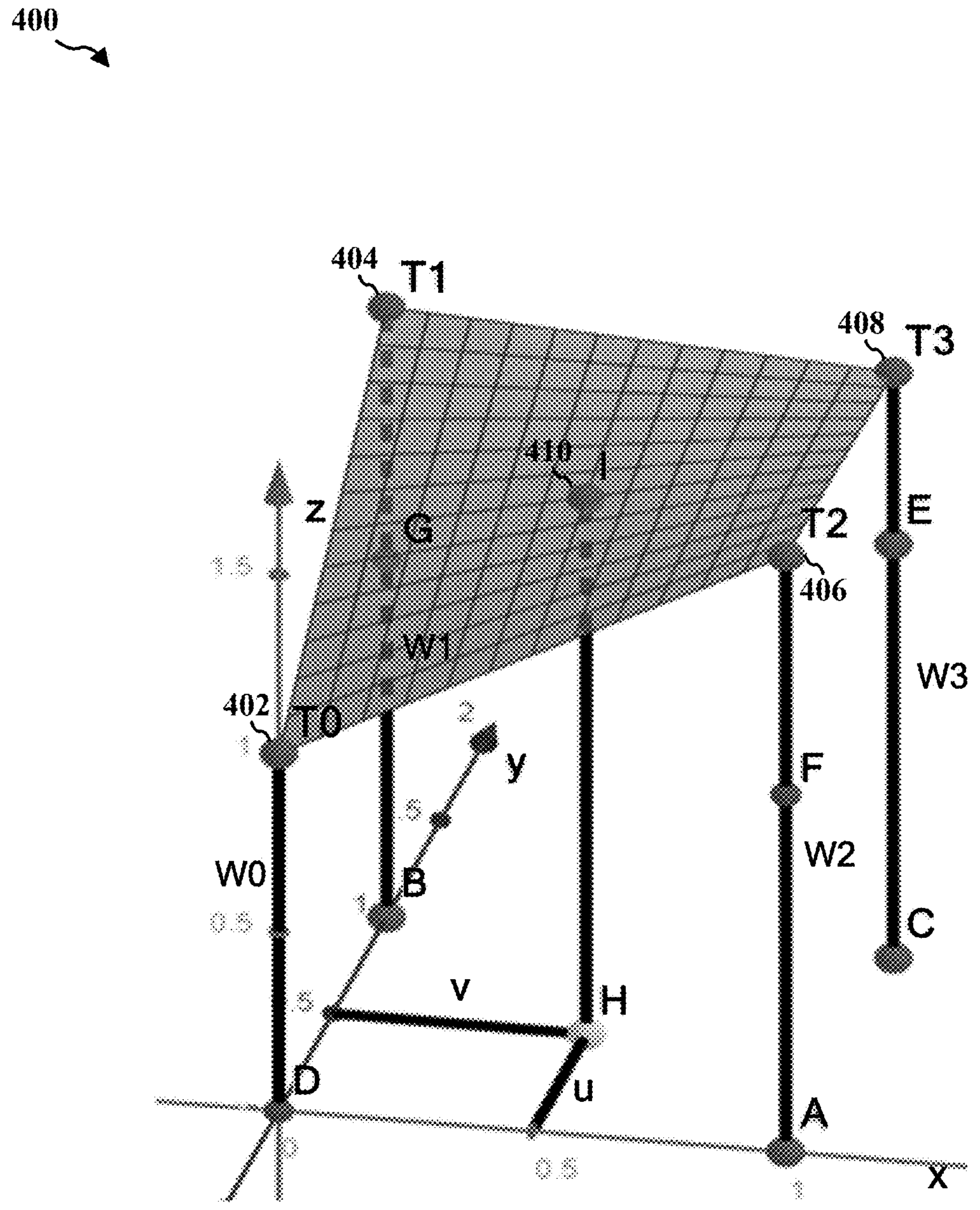
FIG. 4 is a diagram illustrating a set of points having known color values and an interpolation point with an unknown color value, in accordance with one or more techniques of this disclosure.

FIG. 4 is a diagram 400 illustrating a set of points, shown here as point 402, point 404, point 406, and point 408. Each of the point 402, the point 404, the point 406, and the point 408 have known color values, shown here as color value T0, color value T1, color value T2, and color value T3, respectively. The color value may also be referred to as a texture. An interpolation point 410 may have an unknown color value I, which may be derived based on the locations and known color values of the set of known points.

A color interpolator, such as color interpolator 198, may use bilinear interpolation to derive an interpolated color value with a high precision using optimized hardware. Such interpolation may be performed during an interpolation operation, such as texture mapping, image resizing, or image transformation. For example, a color interpolator may dynamically interpolate a color value when performing texture mapping. A program may perform dynamic texture mapping on a three-dimensional (3D) object in a scene. Based on the target object's position and/or shape, the color interpolator may calculate texture pixels with bilinear interpolation. In another example, a color interpolator may resize an image. A color interpolator may perform bilinear image interpolation to resize an image for high resolution screens. In another example, a color interpolator may transform an image. A color interpolator may perform image transformations (e.g., rotating, squeezing) to transform the image. The color interpolator may show the transformed image using interpolated pixels.

A color interpolator may determine an interpolated color value using the known color of the nearest known data points. For example, to determine the interpolated color value I of the interpolation point 410, the color interpolator may use the known color values T0, T1, T2, and T3 of the point 402, the point 404, the point 406, and the point 408. The location of each known point may be normalized on a 1,1 scale, for example the location of the point 402 may be (0,0), the location of the point 404 may be (0, 1), the location of the point 406 may be (1, 0), and the location of the point 408 may be (1,1). The location of the interpolation point 410 may be (u,v) where u≤1 and v≤1. In other words, (u,v) may be the pixel coordinate of the interpolation point 410 with respect to an origin point set at the point 402 as (0,0).

The color interpolator may assign a corresponding weight to each point, such as W0 for the point 402, W1 for the point 404, W2 for the point 406, and W3 for the point 408. The sum of each of the weights may be 1. In other words, $$1 = \sum_{i=0}^{3} Wi.$$

The color interpolator may assign the corresponding weight based on the distance of the interpolation point 410 from each known point. For example, W0=(1−u) (1−v), W1=u (1−v), W2=(1−u) v, and W3=uv. The color interpolator may calculate the color value of the interpolation point 410 by adding the product of each corresponding color value with each corresponding weight for each of the set of known points. In other words:

$$\text{interpolated color} = (W0*T0)+(W1*T1)+(W2*T2)+(W3*T3) \text{ where } 1 = \sum_{i=0}^{3} Wi.$$

For such a calculation, the latency may be at least 1 cycle long. Since a color interpolator may perform interpolation for a large number of pixels during an interpolation operation (e.g., texture mapping), minimizing the area, timing, and/or power resources used to interpolate may be advantageous.

Figure 5:
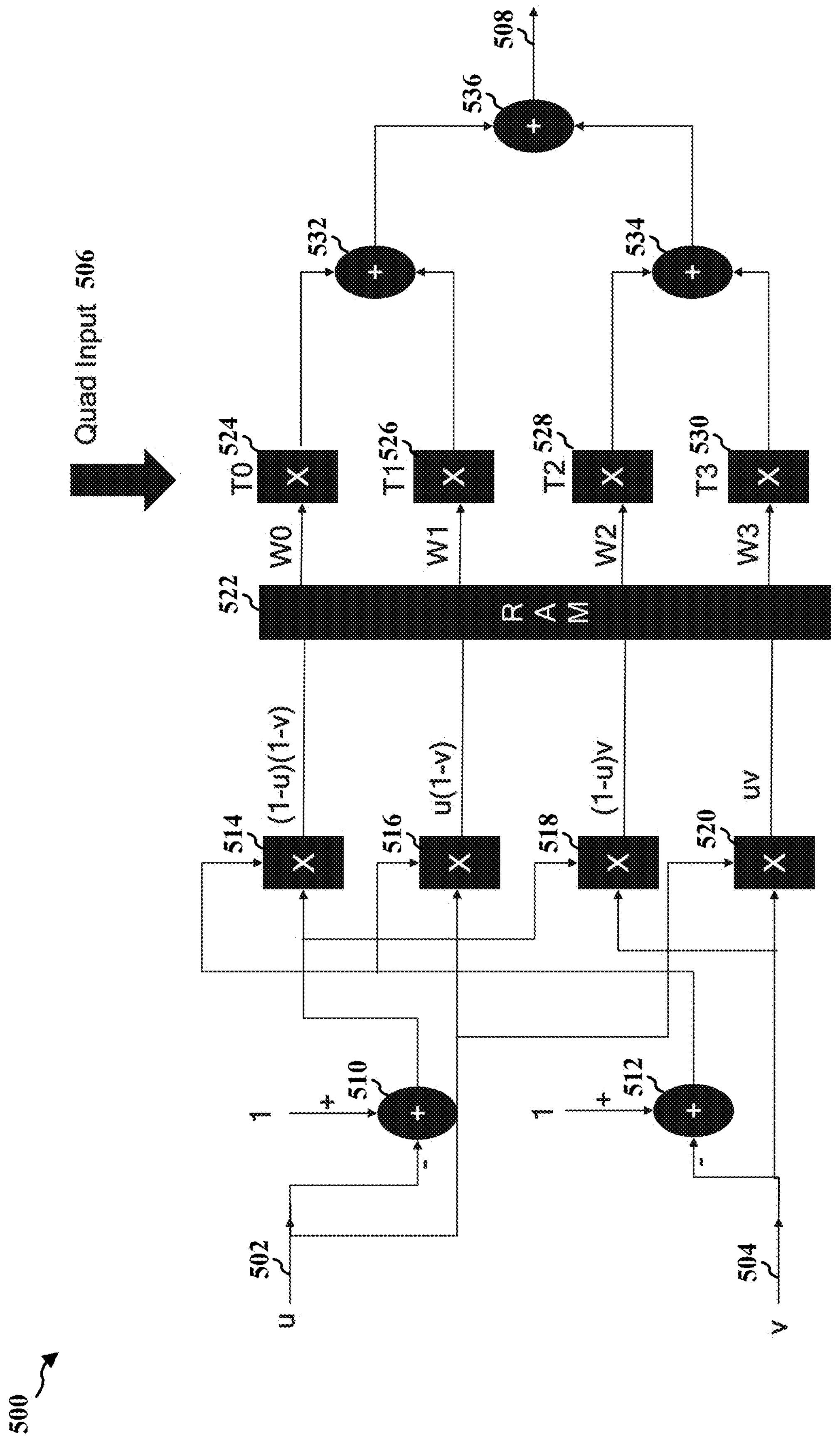
FIG. 5 is a diagram illustrating a hardware architecture that may be used to calculate the color value of the interpolation point in FIG. 4, in accordance with one or more techniques of this disclosure.

FIG. 5 is a diagram 500 illustrating a hardware architecture that may be used to calculate the color value of the interpolation point 410 in FIG. 4. The hardware architecture may accept the location of the interpolation point (e.g., the (u,v) coordinates) as input 502 for u and input 504 for v. The hardware architecture may accept the known color values for each of the four known points as the quad input 506, which includes the known color value T0 for a known point at (0,0), T1 for a known point at (0,1), T2 for a known point at (1,0), and T3 for a known point at (1,1). The adder 510, the adder 512, the multiplier 514, the multiplier 516, the multiplier 518, and the multiplier 520 may be used to calculate the weights W0, W1, W2, and W3 as shown in the diagram 500. The weights may be stored in a register of memory (RAM) 522, which may be fed to the multiplier 524, the multiplier 526, the multiplier 528, and the multiplier 530 to calculate the products of W0*T0, W1*T1, W2*T2, and W3*T3, respectively. The products may be summed using the adder 532, the adder 534, and the adder 536 to produce the output 508, which indicates the determined color value of the interpolation point at (u,v). Accurate precision may be obtained using eight floating point (FP16) multipliers (the multiplier 514, the multiplier 516, the multiplier 518, the multiplier 520, the multiplier 524, the multiplier 526, the multiplier 528, and the multiplier 530) and register storage at the RAM 522.

Figure 6:
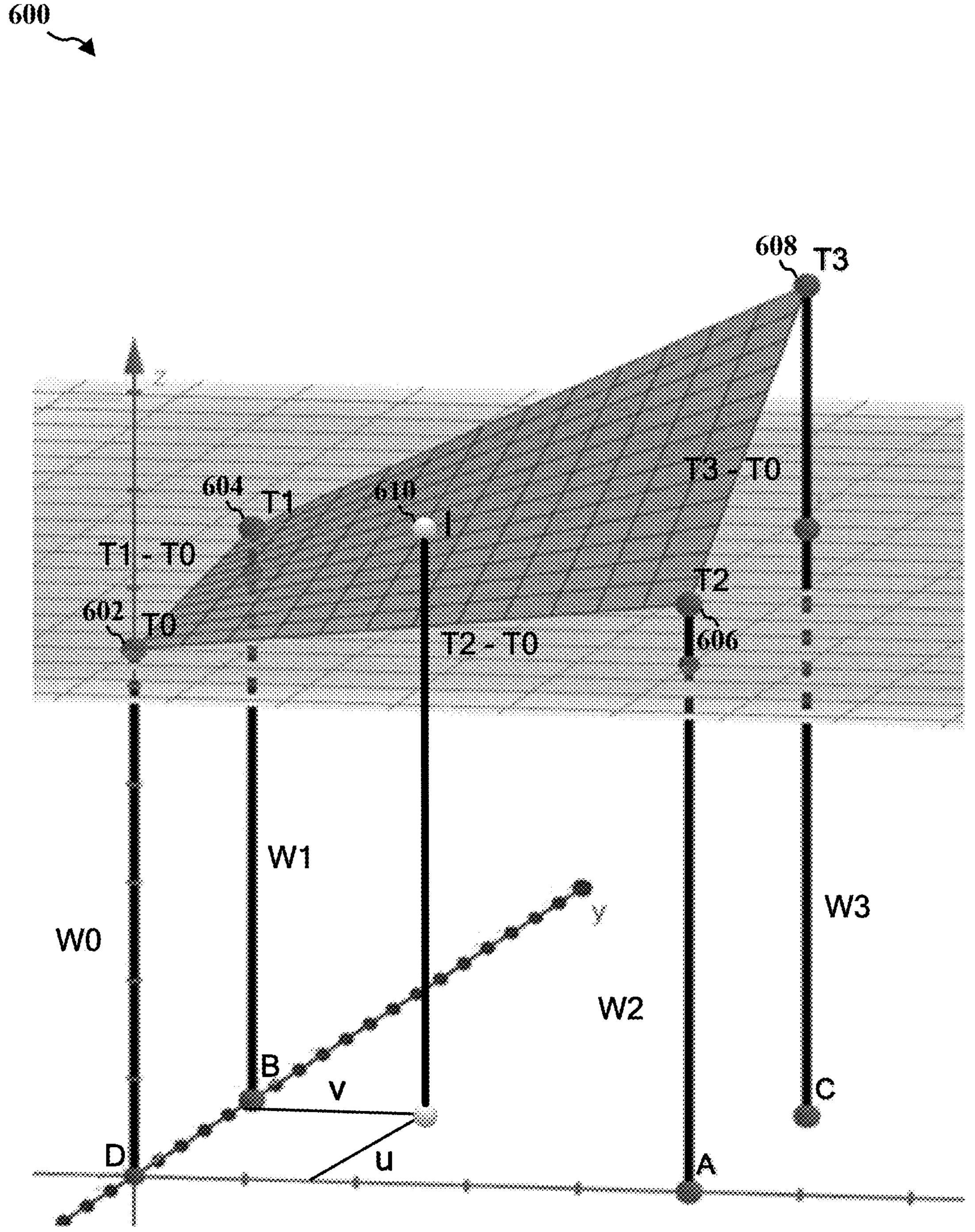
FIG. 6 is a diagram illustrating another set of points having known color values and an interpolation point with an unknown color value, in accordance with one or more techniques of this disclosure.

FIG. 6 is a diagram 600 illustrating a set of points, shown here as point 602, point 604, point 606, and point 608. Each of the point 602, the point 604, the point 606, and the point 608 have known color values, shown here as color value T0, color value T1, color value T2, and color value T3, respectively. The color value may also be referred to as a texture. An interpolation point 610 may have an unknown color value I, which may be derived based on the locations and known color values of the set of known points.

A color interpolator, such as color interpolator 198, may use bilinear interpolation to derive an interpolated color value with a high precision using optimized hardware. Such interpolation may be performed during an interpolation operation, such as texture mapping, image resizing, or image transformation. The color interpolator may determine an interpolated color value using the known color of the nearest known data points.

To determine the interpolated color value I of the interpolation point 610, the color interpolator may use the known color values T0, T1, T2, and T3 of the point 602, the point 604, the point 606, and the point 608. The location of each known point may be normalized on a 1,1 scale, for example the location of the point 602 may be (0,0), the location of the point 604 may be (0, 1), the location of the point 606 may be (1, 0), and the location of the point 608 may be (1,1). The location of the interpolation point 610 may be (u,v) where u≤1 and v≤1. In other words, (u,v) may be the pixel coordinate of the interpolation point 610 with respect to an origin point set at the point 602 as (0,0). However, the color interpolator may refer to the color value of the nearest known data points as relative color values to one of the known data points-referred to as a reference known point. In other words, instead of using direct color to weight multiplication, the color interpolator may use relative color with respect to the known color value of the reference known point (here, the point 602 with color value T0). For example, the color value of the point 602 may be referred to as T0−T0=0, the color value of the point 604 may be referred to as T1−T0, the color value of the point 606 may be referred to as T2−T0, and the color value of the point 608 may be referred to as T3−T0. By using direct color to weight multiplication, the color interpolator may reduce multiplication by calculating interpolation on relative color, and add the color offset in the results.

The color interpolator may assign a corresponding weight to each point, such as W0 for the point 602, W1 for the point 604, W2 for the point 606, and W3 for the point 608. The sum of each of the weights may be 1. In other words, $$1=\sum_{i=0}^{3} Wi.$$

Since the gain of the bilinear filter may be set at 1, moving the offset to any level may be recovered by adding the offset back in the results directly. The color interpolator may assign the corresponding weight based on the values of the coordinates of the interpolation point 610. For example, W0=0, W1=u, W2=v, and W3=uv. The color interpolator may calculate the color value of the interpolation point 610 by adding the product of each corresponding color value with each corresponding weight for each of the set of known points with respect to its relative color value. In other words:

$$\text{interpolated color} = T0+(W1*(T2-T0))+(W2*(T2-T0))+(W3*(T3-T2-(T1-T0))$$

where W1=u, W2=v, and W3=uv.

In other words, $$\text{interpolated color} = T0+(u*(T2-T0))+(v*(T2-T0))+(uv*(T3-T2-(T1-T0))$$

Such a determination also performs gradient plane detection in color. In other words, the determination also detects a twist in a gradient plane. The color interpolator may use the properties of the color gradient in the quad (as arranged in a plane) to optimize the hardware. When colors are in a plane, the hardware circuit may utilize the property of the twist to activate/deactivate some of the hardware (or bypass a circuit).

Figure 7C:
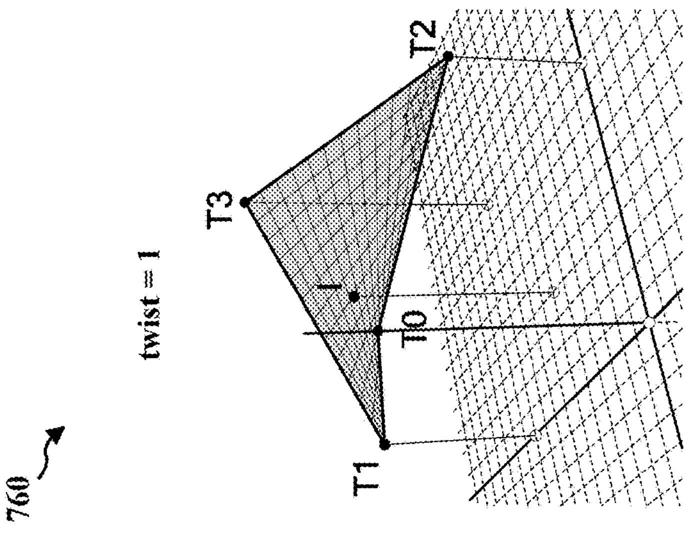
FIG. 7C is a diagram illustrating a set of points on a plane with a twist, in accordance with one or more techniques of this disclosure.
Figure 7B:
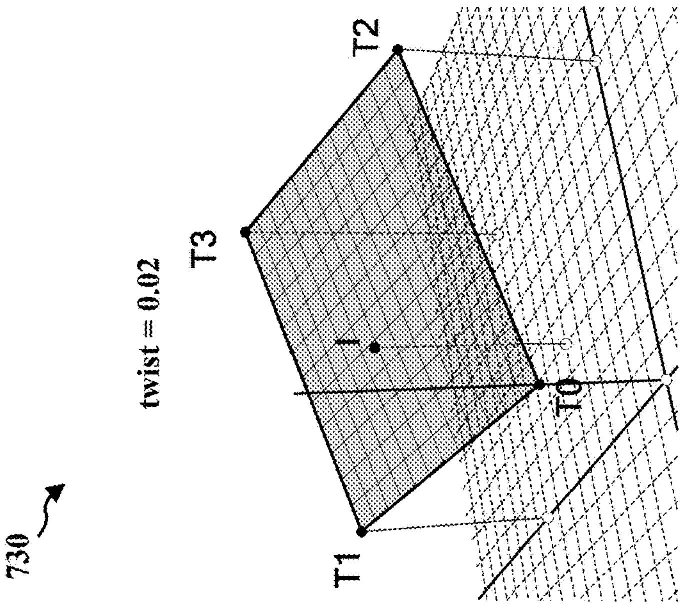
FIG. 7B is a diagram illustrating a set of points on a plane with a twist, in accordance with one or more techniques of this disclosure.
Figure 7A:
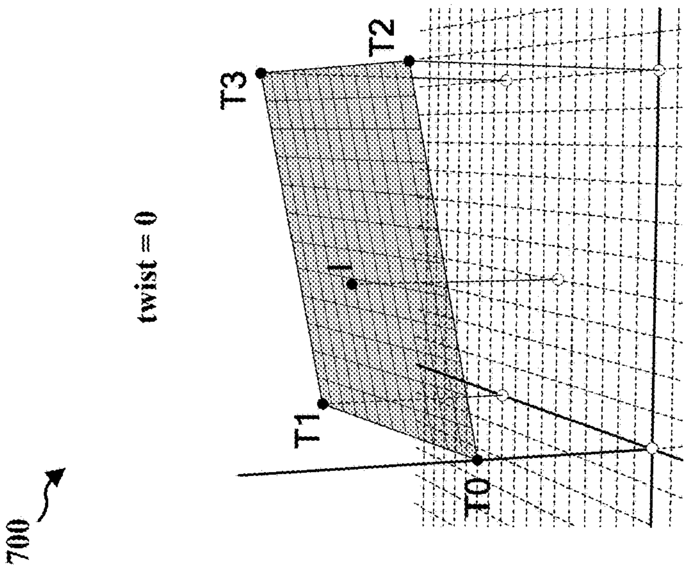
FIG. 7A is a diagram illustrating a set of points on a plane without a twist, in accordance with one or more techniques of this disclosure.

FIG. 7A is a diagram 700 illustrating a set of points on a plane without a twist. In other words, the twist may equal 0. In such an embodiment, the calculation of (T3−T2−(T1−T0)), or T0−T1−T2+T3, may be zero. As a result, the last portion of the calculation above may be obviated—the section (uv*(T3−T2−(T1−T0)), where the twist equals zero.

FIG. 7B is a diagram 730 illustrating a set of points on a plane with a twist. Here, the twist may equal 0.02. In such an embodiment, the calculation of (T3−T2−(T1-T0)), or T0−T1−T2+T3, may be nonzero and may compensate for the gradient plane twist of the set of points on the plane of diagram 730.

FIG. 7C is a diagram 760 illustrating a set of points on a plane with a twist. Here, the twist may equal 1. In such an embodiment, the calculation of (T3−T2−(T1−T0)), or T0−T1−T2+T3, may be nonzero and may compensate for the gradient plane twist of the set of points on the plane of diagram 760.

Figure 8:
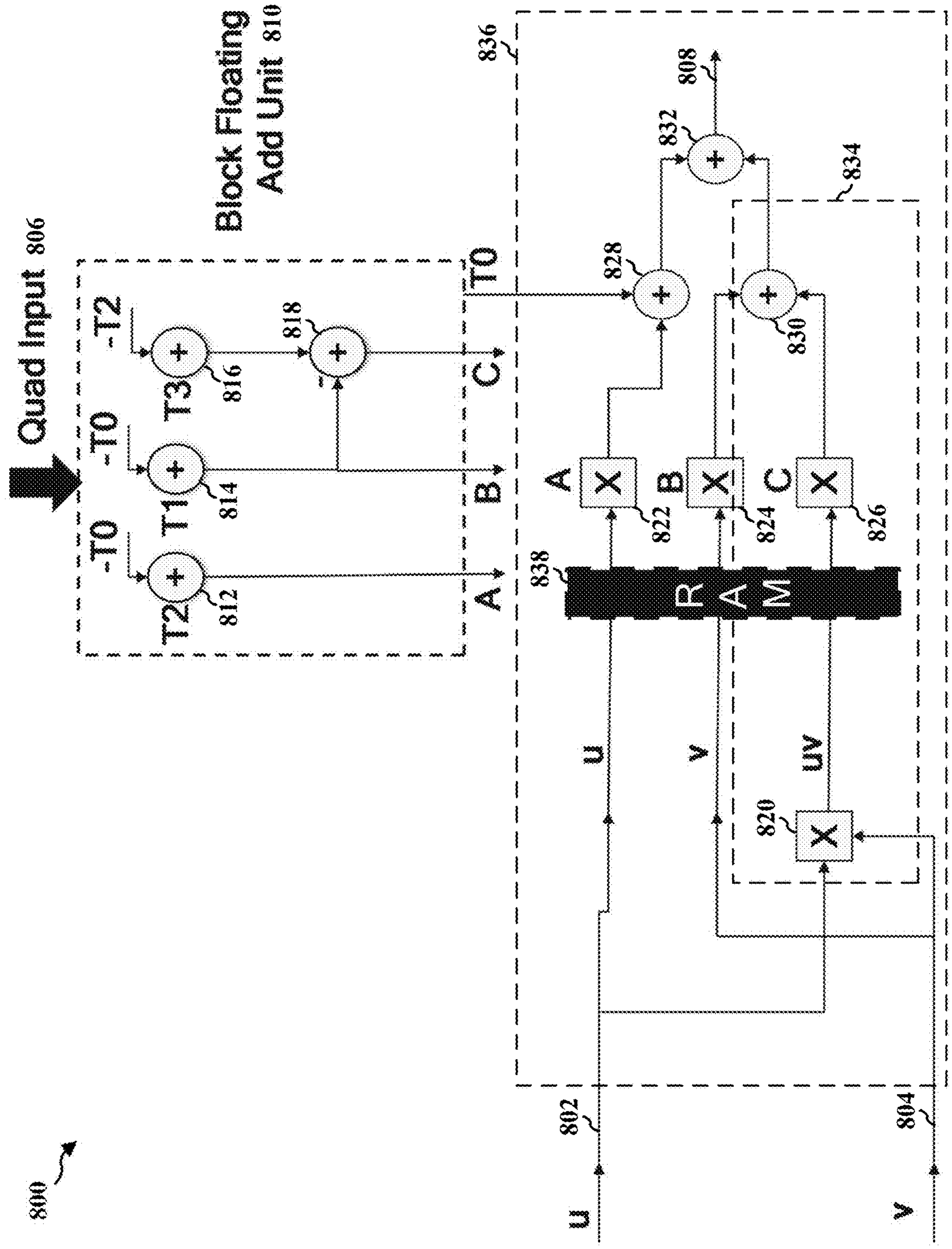
FIG. 8 is a diagram illustrating a hardware architecture that may be used to calculate the color value of the interpolation point in FIG. 6, in accordance with one or more techniques of this disclosure.

FIG. 8 is a diagram 800 illustrating a hardware architecture that may be used to calculate the color value of the interpolation point 610 in FIG. 6. The hardware architecture may accept the location of the interpolation point (e.g., the (u,v) coordinates) as input 802 for u and input 804 for v. The hardware architecture may accept the known color values for each of the four known points as the quad input 806, which includes the known color value T0 for a known point at (0,0), T1 for a known point at (0,1), T2 for a known point at (1,0), and T3 for a known point at (1,1). The color interpolator may pre-compute the relative color of each point with respect to the reference known point (T0) in a fixed point or a block floating point unit, such as the block floating add unit 810. The block floating add unit 810 may accept the quad input 806, and may have the outputs A, B, C, and T0. A=(T2−T0), B=(T1−T0), and C=(T3−T2)−B, or (T3−T2)−(T1−T0). Another way of looking at C, C=(T3−T0)−(A+B). In other words, C may be (T3−T0) computed relative to the sum of the adjacent relative color (A+B). The block floating add unit 810 may have an adder 812 for calculating A, an adder 814 for calculating B, and an adder 816 and an adder 818 for calculating C. The outputs of the block floating add unit 810 may be inputs to the circuit 836 which is used to calculate the output 808, which indicates the determined color value of the interpolation point at (u,v).

The circuit 836 may have a multiplier 820 that is used to calculate the weight W3 as shown in diagram 800. The weights W1 (u), W2 (v), and W3 (uv) may be stored in a RAM 838, which may be fed to the multiplier 822, the multiplier 824, and the multiplier 826 to calculate the products of W1*A, W2*B, and W3*C, respectively. The products may be summed using the adder 828, the adder 830, and the adder 832 to produce the output 808, which indicates the determined color value of the interpolation point at (u,v). Accurate precision may be obtained using four FP16 multipliers (the multiplier 822, the multiplier 824, the multiplier 826, and the multiplier 820) and register storage at the RAM 838. A color interpolator may perform relative computations in common exponent form before converting the computation into a floating point color format.

Since the value of C may be 0 where the gradient plane has no twist (twist=0), the result C may be used to bypass the circuit 834 that includes the multiplier 820, the multiplier 826, and the adder 830. In other words, where C=0, portions of the circuit 836 may be turned off, saving power resources. C=0 where four pixels are found in the same plane. In other words, C may represent the gradient plane twist. In some aspects, a majority of gradient planes may not have a twist, which allows an embodiment that turns off, or bypasses the circuit 834, to save power resources. The output of the multiplier 824 may be directly added to the output of the adder 828 via the adder 832.

The circuit shown in FIG. 8 has four less multipliers than the circuit shown in FIG. 4, reducing the resources used to calculate a color value of an interpolation point. Reducing the number of multipliers in an interpolation circuit may also reduce the area of a hardware circuit. The circuit in FIG. 8 may optimize the floating point architecture, as compared with the circuit shown in FIG. 4, for better plane parallel approximation (PPA) as used in a GPU. For image scaling on a fixed screen, the circuit in FIG. 8 may also provide better PPA with fixed point operations. In other words, the circuit in FIG. 8 may compute the interpolation point using relative colors. Computing an equation using the circuit in FIG. 8 allows a processor to determine an interpolation color for an interpolation point based on the determined relative color.

Figure 9:
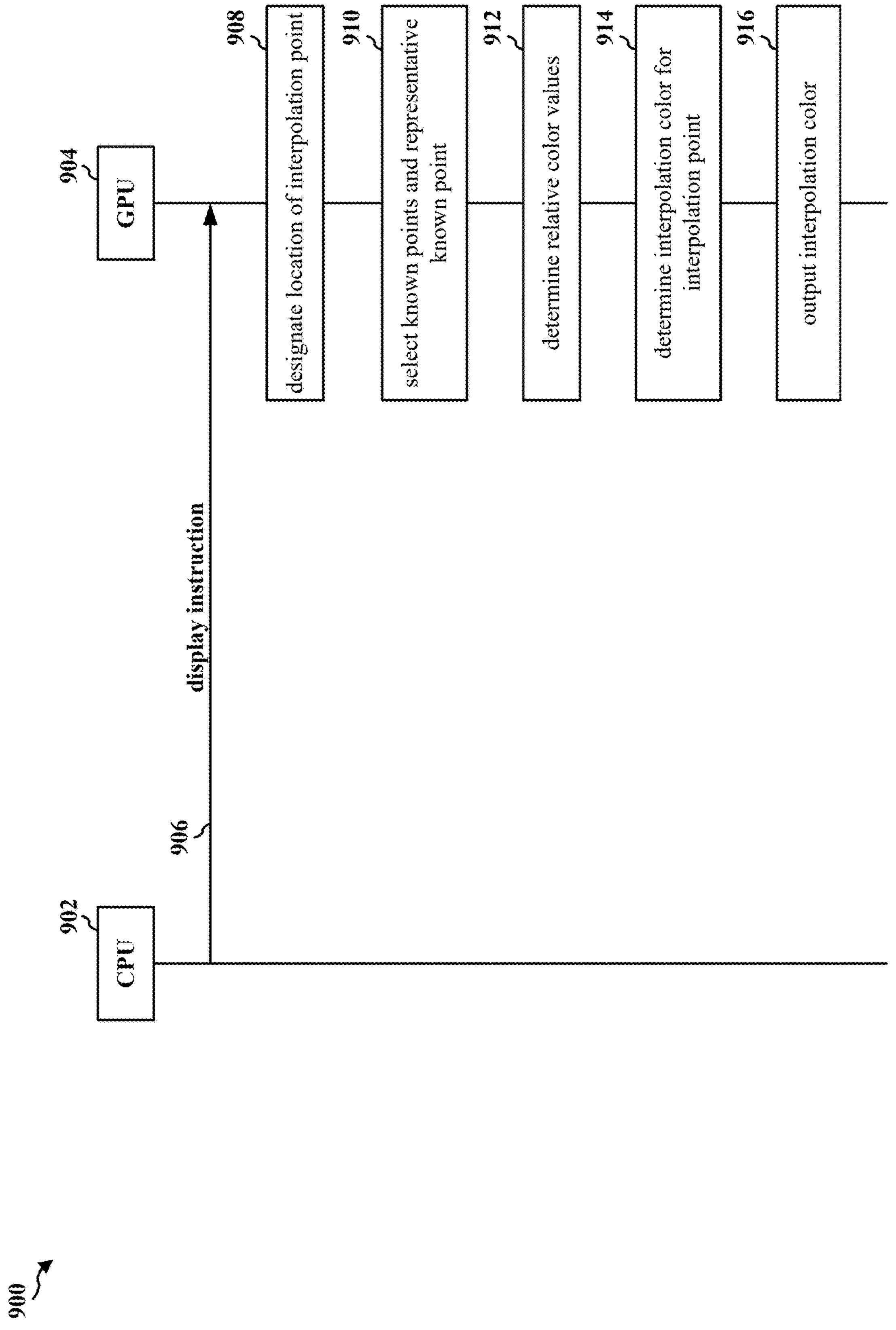
FIG. 9 is a call flow diagram illustrating example communications between a CPU and a GPU in accordance with one or more techniques of this disclosure.

FIG. 9 is a call flow diagram 900 illustrating example communications between a CPU 902 and a GPU 904, in accordance with one or more techniques of this disclosure. A CPU 902 may transmit an indication of a display instruction 906 to the GPU 904. The GPU 904 may receive the indication of the display instruction 906 from the CPU 902. The display instruction may be an instruction for the GPU 904 to render an object to a display. The instruction may entail the GPU 904 to perform interpolation, for example texture mapping, image resizing, or image transformation. At 908, the GPU 904 may designate a location of an interpolation point, where the GPU does not know a color value associated with the location. The GPU 904 may interpolate a color value based on known points about the interpolation point, where each of the known points has a known color value.

At 910, the GPU 904 may select a set of the known points, for example the four closest points about the interpolation point, and may select one of the known points as a representative known point (e.g., T0). At 912, the GPU 904 may determine the relative color values for each of the known points, other than the representative known point, with respect to the color value of the representative known point. At 914, the GPU 904 may determine the interpolation color for the interpolation point based on the determined relative color values, for example by calculating T0+ (u*(T2−T0))+ (v*(T2−T0))+ (uv*(T3−T2−(T1−T0)). At 916, the GPU 904 may output an indication of the interpolation color, for example to a display or to a renderer that caches a set of interpolated pixels for display. At 916, the GPU 904 may output the interpolated color to any suitable display hardware to present the pixel over a display screen, or to save back in the memory as an interpolated pixel of an image or a video frame.

Figure 10:
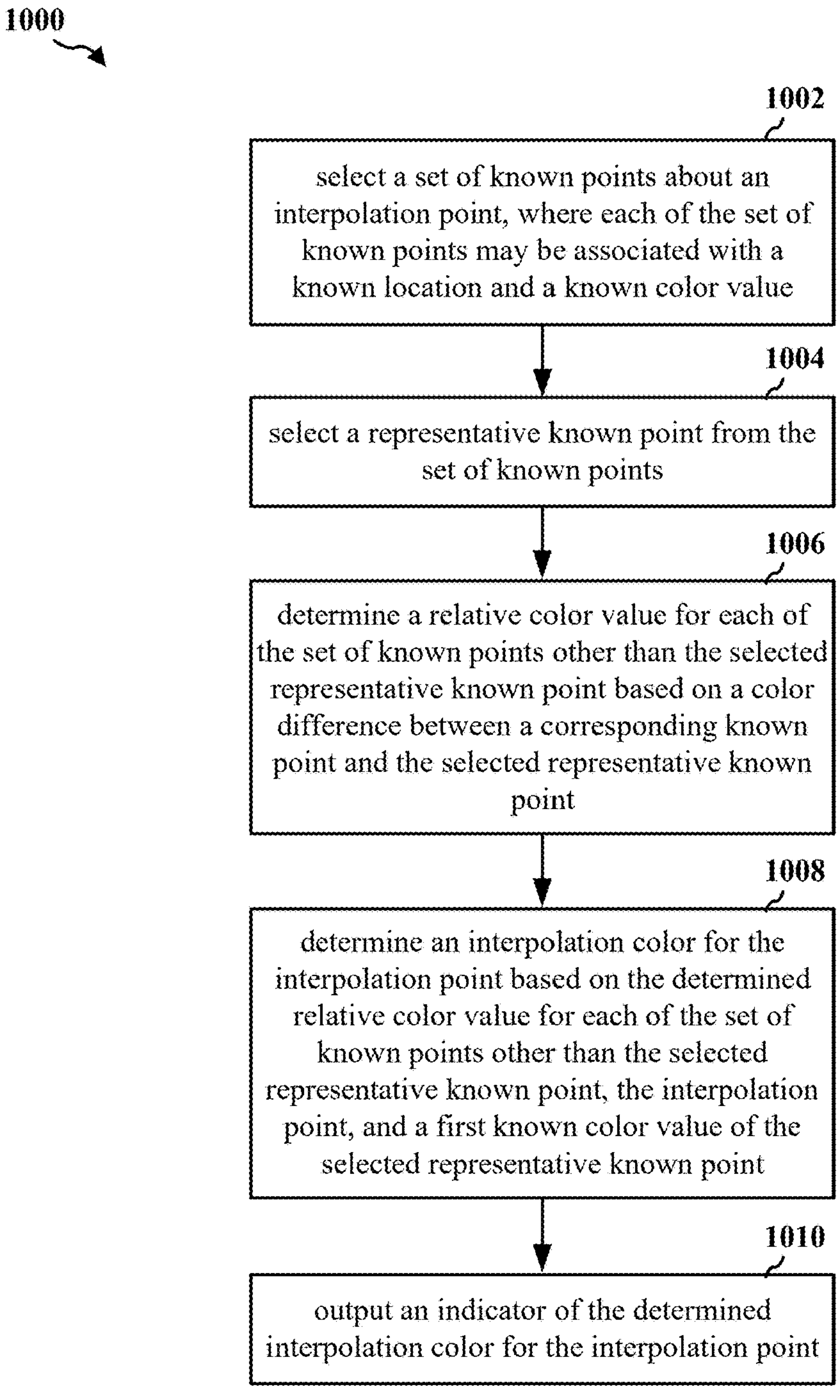
FIG. 10 is a flowchart of an example method of graphics processing in accordance with one or more techniques of this disclosure.

FIG. 10 is a flowchart 1000 of an example method of graphics processing in accordance with one or more techniques of this disclosure. The method may be performed by an apparatus, such as an apparatus for graphics processing, a GPU, a CPU, a wireless communication device, and the like, as used in connection with the aspects of FIGS. 1-6, 7A-7C, and 8-9.

At 1002, the apparatus may select a set of known points about an interpolation point. Each of the set of known points may be associated with a known location and a known color value. For example, 1002 may be performed by the GPU 904 in FIG. 9, which may select a set of known points about an interpolation point. Each of the set of known points may be associated with a known location and a known color value. Moreover, 1002 may be performed by the color interpolator 198 in FIG. 1.

At 1004, the apparatus may select an origin known point from the set of known points. For example, 1004 may be performed by the GPU 904 in FIG. 9, which may select an origin known point from the set of known points. Moreover, 1004 may be performed by the color interpolator 198 in FIG. 1.

At 1006, the apparatus may determine a relative color value for each of the set of known points other than the selected origin known point based on a color difference between a corresponding known point and the selected origin known point. For example, 1006 may be performed by the GPU 904 in FIG. 9, which may determine a relative color value for each of the set of known points other than the selected origin known point based on a color difference between a corresponding known point and the selected origin known point. Moreover, 1006 may be performed by the color interpolator 198 in FIG. 1.

At 1008, the apparatus may determine an interpolation color for the interpolation point based on the determined relative color value for each of the set of known points other than the selected origin known point, the interpolation point, and a first known color value of the selected origin known point. For example, 1008 may be performed by the GPU 904 in FIG. 9, which may determine an interpolation color for the interpolation point based on the determined relative color value for each of the set of known points other than the selected origin known point, the interpolation point, and a first known color value of the selected origin known point. Moreover, 1008 may be performed by the color interpolator 198 in FIG. 1.

At 1010, the apparatus may output an indicator of the determined interpolation color for the interpolation point. For example, 1010 may be performed by the GPU 904 in FIG. 9, which may output an indicator of the determined interpolation color for the interpolation point. Moreover, 1010 may be performed by the color interpolator 198 in FIG. 1.

In configurations, a method or an apparatus for graphics processing is provided. The apparatus may be a GPU, a CPU, or some other processor that may perform graphics processing. In aspects, the apparatus may be the processing unit 120 within the device 104, or may be some other hardware within the device 104 or another device. The apparatus may include means for selecting a set of known points about an interpolation point. Each of the set of known points may be associated with a known location and a known color value. The apparatus may further include means for selecting a reference known point from the set of known points. The apparatus may further include means for determining a relative color value for each of the set of known points other than the selected reference known point based on a color difference between a corresponding known point and the selected reference known point. The apparatus may further include means for determining an interpolation color for the interpolation point based on the determined relative color value for each of the set of known points other than the selected reference known point, the interpolation point, and a first known color value of the selected reference known point. The apparatus may further include means for outputting an indicator of the determined interpolation color for the interpolation point. The apparatus may further include means for selecting the set of known points by selecting at most four known points about the interpolation point. The apparatus may further include means for determining the relative color value for each of the set of known points other than the selected reference known point based on the color difference between the corresponding known point and the selected reference known point by (a) determining a first relative color value for a first known point of the set of known points as a first color difference between a second known color value of the first known point and the first known color value of the selected reference known point, (b) determining a second relative color value for a second known point of the set of known points as a second color difference between a third known color value of the second known point and the first known color value of the selected reference known point, and (c) determining a third relative color value for a third known point of the set of known points as a third color difference between a fourth known color value of the third known point and a sum of the second known color value of the first known point and the second relative color value. The apparatus may further include means for determining the interpolation color for the interpolation point based on the determined relative color value for each of the set of known points other than the selected reference known point, the interpolation point, and the first known color value of the selected reference known point by bypassing a logical circuit associated with a product of a first dimension and a second dimension of the interpolation point in response to the third relative color value equaling zero. The apparatus may further include means for determining the interpolation color for the interpolation point based on the determined relative color value for each of the set of known points other than the selected reference known point, the interpolation point, and the first known color value of the selected reference known point by (a) multiplying the first relative color value with a first dimension of the interpolation point, (b) multiplying the second relative color value with a second dimension of the interpolation point, and (c) adding a first product of the first relative color value and the first dimension of the interpolation point and a second product of the second relative color value and the second dimension of the interpolation point to the first known color value of the selected reference known point. The third relative color value may compensate for a gradient plane twist of the set of known points. The apparatus may further include means for determining the interpolation color for the interpolation point based on the determined relative color value for each of the set of known points other than the selected reference known point, the interpolation point, and the first known color value of the selected reference known point further by adding a third product of the first dimension of the interpolation point, the second dimension of the interpolation point, and the third relative color value to a second sum of the first product, the second product, and the first known color value. The apparatus may further include means for determining the relative color value for each of the set of known points other than the selected reference known point based on the color difference between the corresponding known point and the selected reference known point further by determining the relative color value for each of the set of known points other than the selected reference known point using four adders. The bypassed logical circuit may include two multipliers. The apparatus may further include means for determining the interpolation color for the interpolation point based on the determined relative color value for each of the set of known points other than the selected reference known point, the interpolation point, and the first known color value of the selected reference known point further by determining the interpolation color for the interpolation point using two multipliers and an adder. The apparatus may further include means for determining the interpolation color for the interpolation point based on the determined relative color value for each of the set of known points other than the selected reference known point, the interpolation point, and the first known color value of the selected reference known point by determining the interpolation color for the interpolation point using four multipliers and three adders.

It is understood that the specific order or hierarchy of blocks/steps in the processes, flowcharts, and/or call flow diagrams disclosed herein is an illustration of example approaches. Based upon design preferences, it is understood that the specific order or hierarchy of the blocks/steps in the processes, flowcharts, and/or call flow diagrams may be rearranged. Further, some blocks/steps may be combined and/or omitted. Other blocks/steps may also be added. The accompanying method claims present elements of the various blocks/steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, where reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects.

Unless specifically stated otherwise, the term "some" refers to one or more and the term "or" may be interpreted as "and/or" where context does not dictate otherwise. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for." Unless stated otherwise, the phrase "a processor" may refer to "any of one or more processors" (e.g., one processor of one or more processors, a number (greater than one) of processors in the one or more processors, or all of the one or more processors) and the phrase "a memory" may refer to "any of one or more memories" (e.g., one memory of one or more memories, a number (greater than one) of memories in the one or more memories, or all of the one or more memories).

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium.

Computer-readable media may include computer data storage media or communication media including any medium that facilitates transfer of a computer program from one place to another. In this manner, computer-readable media generally may correspond to: (1) tangible computer-readable storage media, which is non-transitory; or (2) a communication medium such as a signal or carrier wave. Data storage media may be any available media that can be accessed by one or more computers or one or more processors to retrieve instructions, code, and/or data structures for implementation of the techniques described in this disclosure. By way of example, and not limitation, such computer-readable media may include RAM, ROM, EEPROM, compact disc-read only memory (CD-ROM), or other optical disk storage, magnetic disk storage, or other magnetic storage devices. Disk and disc, as used herein, includes compact disc (CD), laser disc, optical disc, digital versatile disc (DVD), floppy disk, and Blu-ray disc, where disks usually reproduce data magnetically, while discs usually reproduce data optically with lasers. Combinations of the above should also be included within the scope of computer-readable media. A computer program product may include a computer-readable medium.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of inter-operative hardware units, including one or more processors as described above, in conjunction with suitable software and/or firmware. Accordingly, the term "processor," as used herein may refer to any of the foregoing structure or any other structure suitable for implementation of the techniques described herein. Also, the techniques may be fully implemented in one or more circuits or logic elements.

The following aspects are illustrative only and may be combined with other aspects or teachings described herein, without limitation.

Aspect 1 is a method of graphics processing, comprising: selecting a set of known points about an interpolation point, wherein each of the set of known points is associated with a known location and a known color value; selecting a reference known point from the set of known points; determining a relative color value for each of the set of known points other than the selected reference known point based on a color difference between a corresponding known point and the selected reference known point; determining an interpolation color for the interpolation point based on the determined relative color value for each of the set of known points other than the selected reference known point, the interpolation point, and a first known color value of the selected reference known point; and outputting an indicator of the determined interpolation color for the interpolation point.

Aspect 2 is the method of aspect 1, wherein selecting the set of known points comprises: selecting at most four known points about the interpolation point.

Aspect 3 is the method of either of aspects 1 or 2, wherein determining the relative color value for each of the set of known points other than the selected reference known point based on the color difference between the corresponding known point and the selected reference known point comprises: determining a first relative color value for a first known point of the set of known points as a first color difference between a second known color value of the first known point and the first known color value of the selected reference known point; determining a second relative color value for a second known point of the set of known points as a second color difference between a third known color value of the second known point and the first known color value of the selected reference known point; and determining a third relative color value for a third known point of the set of known points as a third color difference between a fourth known color value of the third known point and a sum of the second known color value of the first known point and the second relative color value.

Aspect 4 is the method of aspect 3, wherein determining the interpolation color for the interpolation point based on the determined relative color value for each of the set of known points other than the selected reference known point, the interpolation point, and the first known color value of the selected reference known point comprises: bypassing a logical circuit associated with a product of a first dimension and a second dimension of the interpolation point in response to the third relative color value equaling zero.

Aspect 5 is the method of either of aspects 3 or 4, wherein determining the interpolation color for the interpolation point based on the determined relative color value for each of the set of known points other than the selected reference known point, the interpolation point, and the first known color value of the selected reference known point comprises: multiplying the first relative color value with a first dimension of the interpolation point; multiplying the second relative color value with a second dimension of the interpolation point; and adding a first product of the first relative color value and the first dimension of the interpolation point and a second product of the second relative color value and the second dimension of the interpolation point to the first known color value of the selected reference known point.

Aspect 6 is the method of aspect 5, wherein the third relative color value compensates for a gradient plane twist of the set of known points. The third relative color value (e.g., C) may represent the gradient plane twist.

Aspect 7 is the method of either of aspects 5 or 6, wherein determining the interpolation color for the interpolation point based on the determined relative color value for each of the set of known points other than the selected reference known point, the interpolation point, and the first known color value of the selected reference known point further comprises: adding a third product of the first dimension of the interpolation point, the second dimension of the interpolation point, and the third relative color value to a second sum of the first product, the second product, and the first known color value.

Aspect 8 is the method of any of aspects 3 to 7, wherein determining the relative color value for each of the set of known points other than the selected reference known point based on the color difference between the corresponding known point and the selected reference known point further comprises: determining the relative color value for each of the set of known points other than the selected reference known point using four adders.

Aspect 9 is the method of any of aspects 4 to 8, wherein the bypassed logical circuit comprises two multipliers.

Aspect 10 is the method of any of aspects 5 to 9, wherein determining the interpolation color for the interpolation point based on the determined relative color value for each of the set of known points other than the selected reference known point, the interpolation point, and the first known color value of the selected reference known point further comprises: determining the interpolation color for the interpolation point using two multipliers and an adder.

Aspect 11 is the method of any of aspects 7 to 10, wherein determining the interpolation color for the interpolation point based on the determined relative color value for each of the set of known points other than the selected reference known point, the interpolation point, and the first known color value of the selected reference known point further comprises: determining the interpolation color for the interpolation point using four multipliers and three adders.

Aspect 12 is an apparatus for graphics processing including at least one processor coupled to a memory and configured to implement a method as in any of aspects 1-11.

Aspect 13 may be combined with aspect 12 and includes that the apparatus is a wireless communication device.

Aspect 14 is an apparatus for graphics processing including means for implementing a method as in any of aspects 1-12.

Aspect 15 is a computer-readable medium (e.g., a non-transitory computer-readable medium) storing computer executable code, the code when executed by at least one processor causes the at least one processor to implement a method as in any of aspects 1-12.

Various aspects have been described herein. These and other aspects are within the scope of the following claims.

What is claimed is:

1. An apparatus for graphics processing, comprising:

a memory; and a processor coupled to the memory and, based at least in part on information stored in the memory, the processor is configured to:

select a plurality of known points about an interpolation point, wherein each known point of the plurality of known points is associated with a known location and a known color value;

select a reference known point from the plurality of known points;

determine a relative color value for each known point of the plurality of known points other than the selected reference known point based on a color difference between a corresponding known point and the selected reference known point;

bypass a logical circuit associated with a product of a first dimension and a second dimension of the interpolation point in response to the relative color value for at least one known point of the plurality of known points equaling zero;

determine an interpolation color for the interpolation point based on the determined relative color value for each known point of the plurality of known points other than the selected reference known point, the interpolation point, and a first known color value of the selected reference known point; and output an indicator of the determined interpolation color for the interpolation point.

2. The apparatus of claim 1, wherein, to select the plurality of known points, the processor is configured to:

select at most four known points about the interpolation point.

3. The apparatus of claim 1, wherein, to determine the relative color value for each known point of the plurality of known points other than the selected reference known point based on the color difference between the corresponding known point and the selected reference known point, the processor is configured to:

determine a first relative color value for a first known point of the plurality of known points as a first color difference between a second known color value of the first known point and the first known color value of the selected reference known point;

determine a second relative color value for a second known point of the plurality of known points as a second color difference between a third known color value of the second known point and the first known color value of the selected reference known point; and determine a third relative color value for a third known point of the plurality of known points as a third color difference between a fourth known color value of the third known point and a sum of the second known color value of the first known point and the second relative color value.

4. The apparatus of claim 3, wherein, to bypass the logical circuit associated with the product of the first dimension and the second dimension of the interpolation point in response to the relative color value for at least one known point of the plurality of known points equaling zero, the processor is configured to:

bypass the logical circuit in response to the third relative color value equaling zero.

5. The apparatus of claim 3, wherein, to determine the interpolation color for the interpolation point based on the determined relative color value for each known point of the plurality of known points other than the selected reference known point, the interpolation point, and the first known color value of the selected reference known point, the processor is configured to:

multiply the first relative color value with the first dimension of the interpolation point;

multiply the second relative color value with the second dimension of the interpolation point; and add a first product of the first relative color value and the first dimension of the interpolation point and a second product of the second relative color value and the second dimension of the interpolation point to the first known color value of the selected reference known point.

6. The apparatus of claim 5, wherein the third relative color value compensates for a gradient plane twist of the plurality of known points.

7. The apparatus of claim 5, wherein, to determine the interpolation color for the interpolation point based on the determined relative color value for each known point of the plurality of known points other than the selected reference known point, the interpolation point, and the first known color value of the selected reference known point, the processor is further configured to:

add a third product of the first dimension of the interpolation point, the second dimension of the interpolation point, and the third relative color value to a second sum of the first product, the second product, and the first known color value.

8. The apparatus of claim 7, wherein, to determine the interpolation color for the interpolation point based on the determined relative color value for each known point of the plurality of known points other than the selected reference known point, the interpolation point, and the first known color value of the selected reference known point, the processor is further configured to:

determine the interpolation color for the interpolation point using four multipliers and three adders.

9. The apparatus of claim 5, wherein, to determine the interpolation color for the interpolation point based on the determined relative color value for each known point of the plurality of known points other than the selected reference known point, the interpolation point, and the first known color value of the selected reference known point, the processor is further configured to:

determine the interpolation color for the interpolation point using two multipliers and an adder.

10. The apparatus of claim 3, wherein, to determine the relative color value for each known point of the plurality of known points other than the selected reference known point based on the color difference between the corresponding known point and the selected reference known point, the processor is further configured to:

determine the relative color value for each known point of the plurality of known points other than the selected reference known point using four adders.

11. The apparatus of claim 1, wherein the bypassed logical circuit comprises two multipliers.

12. The apparatus of claim 1, wherein the apparatus comprises a wireless communication device.

13. A method of graphics processing, comprising:

selecting a plurality of known points about an interpolation point, wherein each known point of the plurality of known points is associated with a known location and a known color value;

selecting a reference known point from the plurality of known points;

determining a relative color value for each known point of the plurality of known points other than the selected reference known point based on a color difference between a corresponding known point and the selected reference known point;

bypassing a logical circuit associated with a product of a first dimension and a second dimension of the interpolation point in response to the relative color value for at least one known point of the plurality of known points equaling zero;

determining an interpolation color for the interpolation point based on the determined relative color value for each known point of the plurality of known points other than the selected reference known point, the interpolation point, and a first known color value of the selected reference known point; and outputting an indicator of the determined interpolation color for the interpolation point.

14. The method of claim 13, wherein determining the relative color value for each known point of the plurality of known points other than the selected reference known point based on the color difference between the corresponding known point and the selected reference known point comprises:

determining a first relative color value for a first known point of the plurality of known points as a first color difference between a second known color value of the first known point and the first known color value of the selected reference known point;

determining a second relative color value for a second known point of the plurality of known points as a second color difference between a third known color value of the second known point and the first known color value of the selected reference known point; and determining a third relative color value for a third known point of the plurality of known points as a third color difference between a fourth known color value of the third known point and a sum of the second known color value of the first known point and the second relative color value.

15. The method of claim 14, wherein bypassing the logical circuit associated with the product of the first dimension and the second dimension of the interpolation point in response to the relative color value for at least one known point of the plurality of known points equaling zero comprises:

bypassing the logical circuit in response to the third relative color value equaling zero.

16. The method of claim 14, wherein determining the interpolation color for the interpolation point based on the determined relative color value for each known point of the plurality of known points other than the selected reference known point, the interpolation point, and the first known color value of the selected reference known point comprises:

multiplying the first relative color value with the first dimension of the interpolation point;

multiplying the second relative color value with the second dimension of the interpolation point; and adding a first product of the first relative color value and the first dimension of the interpolation point and a second product of the second relative color value and the second dimension of the interpolation point to the first known color value of the selected reference known point.

17. The method of claim 16, wherein determining the interpolation color for the interpolation point based on the determined relative color value for each known point of the plurality of known points other than the selected reference known point, the interpolation point, and the first known color value of the selected reference known point further comprises:

adding a third product of the first dimension of the interpolation point, the second dimension of the interpolation point, and the third relative color value to a second sum of the first product, the second product, and the first known color value.

18. The method of claim 14, wherein determining the relative color value for each known point of the plurality of known points other than the selected reference known point based on the color difference between the corresponding known point and the selected reference known point further comprises:

determining the relative color value for each known point of the plurality of known points other than the selected reference known point using four adders.

19. A non-transitory computer-readable medium storing computer executable code, the code, when executed by a processor, causes the processor to:

select a plurality of known points about an interpolation point, wherein each known point of the plurality of known points is associated with a known location and a known color value;

select a reference known point from the plurality of known points;

determine a relative color value for each known point of the plurality of known points other than the selected reference known point based on a color difference between a corresponding known point and the selected reference known point;

bypass a logical circuit associated with a product of a first dimension and a second dimension of the interpolation point in response to the relative color value for at least one known point of the plurality of known points equaling zero;

determine an interpolation color for the interpolation point based on the determined relative color value for each known point of the plurality of known points other than the selected reference known point, the interpolation point, and a first known color value of the selected reference known point; and output an indicator of the determined interpolation color for the interpolation point.

20. The non-transitory computer-readable medium of claim 19, wherein, to determine the relative color value for each known point of the plurality of known points other than the selected reference known point based on the color difference between the corresponding known point and the selected reference known point, the code when executed by the processor, causes the processor to:

determine a first relative color value for a first known point of the plurality of known points as a first color difference between a second known color value of the first known point and the first known color value of the selected reference known point;

determine a second relative color value for a second known point of the plurality of known points as a second color difference between a third known color value of the second known point and the first known color value of the selected reference known point; and determine a third relative color value for a third known point of the plurality of known points as a third color difference between a fourth known color value of the third known point and a sum of the second known color value of the first known point and the second relative color value.

* * * * *